United States Patent
Sun et al.

(10) Patent No.: US 6,723,799 B2
(45) Date of Patent: Apr. 20, 2004

(54) ACID-DYEABLE POLYMER COMPOSITIONS

(75) Inventors: Yanhui Sun, Wilmington, DE (US); David P. Higley, Wilmington, DE (US)

(73) Assignee: E I. du Pont de Nemours and Company, Wilmington, DE (US)

( * ) Notice: Subject to any disclaimer, the term of this patent is extended or adjusted under 35 U.S.C. 154(b) by 20 days.

(21) Appl. No.: 09/938,760

(22) Filed: Aug. 24, 2001

(65) Prior Publication Data

US 2003/0083441 A1 May 1, 2003

(51) Int. Cl.⁷ .......................... C08L 77/00; C08L 67/02; C08G 69/44
(52) U.S. Cl. ....................... 525/419; 525/420; 525/425; 525/437; 524/99; 524/357; 524/539; 428/357; 428/364; 428/394; 428/395; 428/475.2; 428/480; 528/272; 528/288; 528/310
(58) Field of Search ................................ 525/419, 425, 525/420, 437; 428/357, 475.2, 364, 394, 395, 480; 524/539, 99, 357; 528/272, 288, 310

(56) References Cited

U.S. PATENT DOCUMENTS

| | | |
|---|---|---|
| 3,305,603 A | 2/1967 | McIntyre et al. |
| 3,555,115 A | 1/1971 | Bottomley et al. |
| 3,616,160 A * | 10/1971 | Wincklhofer et al. ....... 442/365 |
| 3,646,594 A * | 2/1972 | Lasky et al. .................. 95/106 |
| 3,867,478 A | 2/1975 | Chimura et al. |
| 3,901,853 A | 8/1975 | Tanikella |
| 3,932,126 A | 1/1976 | Jilla |
| 4,001,189 A | 1/1977 | Tanikella et al. |
| 4,001,190 A | 1/1977 | Tanikella et al. |
| 4,104,324 A | 8/1978 | Radlmann et al. |
| 4,145,473 A | 3/1979 | Samuelson et al. |
| 5,000,792 A | 3/1991 | Ohta et al. |
| 5,068,283 A | 11/1991 | Ohmae et al. |
| 5,322,923 A | 6/1994 | Lahary et al. |
| 5,393,849 A | 2/1995 | Srinivasan et al. |
| 5,632,944 A * | 5/1997 | Blackwell ............... 264/172.15 |
| 6,090,494 A * | 7/2000 | Rao .......................... 428/475.2 |
| 6,277,289 B1 | 8/2001 | Kurian et al. |
| 6,331,264 B1 * | 12/2001 | Kurian et al. ........... 264/172.17 |
| 6,458,455 B1 * | 10/2002 | Hernandez et al. .......... 428/359 |
| 6,576,340 B1 * | 6/2003 | Sun et al. .................... 428/373 |
| 2003/0045674 A1 * | 3/2003 | Higley ........................ 528/332 |

FOREIGN PATENT DOCUMENTS

| | | |
|---|---|---|
| CA | 974340 | 9/1975 |
| CA | 1028347 | 3/1978 |
| DE | 2233273 | 1/1973 |
| GB | 1373858 | 11/1974 |
| JP | 1972-32184 | 11/1972 |
| JP | 48 080200 A | 10/1973 |
| JP | 57 195144 A | 11/1982 |
| JP | 59 091147 A | 5/1984 |
| JP | 95053699 A | 2/1995 |
| WO | WO 00/58393 | 10/2000 |
| WO | WO 01/34693 A2 | 5/2001 |

OTHER PUBLICATIONS

International Search Report dated Nov. 19, 2002.
Teijin Ltd., Japan; "Polyester Compositions"; Database CA Online!, Chemical Abstracts Service, Columbus, Ohio, retrieved from STN Database accession No. 101:193565 XP002219565 English Abstract: JP 59 091147A (Teijin Ltd.) May 25, 1984.
Database WPI, Section CH, Week 198302; Derwent Publications Ltd., London, GB; AN 1983–03607K XP002219566 English Abstract: JP 57 195144A (Teijin Ltd.) Nov. 30, 1982.
Database WPI, Section Ch, Week 197419; Derwent Publications Ltd., London, GB; AN 1974–35279V XP002219571 English Abstract: JP 48 080200A (Unitika Ltd.) Oct. 26, 1973.
Nakagawa, Asaharu et al; "Polyester Fibers with Improved Dye Affinity"; Database CA Online!, Chemical Abstracts Service, Columbus, Ohio, retrieved from STN Database accession No. 78:31286 XP002219524 English Abstract: JP 47 018893B (Toray Industries, Inc.) May 31, 1972.
Nakagawa, Asaharu et al; "Modified Polyester Fibers Having Improved Dyeability Especially for Acid Dyes"; Database CA Online!, Chemical Abstracts Service, Columbus, Ohio, retrieved from STN Database accession No. 81:38771 XP002219525 English Abstract: JP 48 033421B (Toray Industries, Inc.) Oct. 13, 1973.

* cited by examiner

Primary Examiner—P. Hampton-Hightower
(74) Attorney, Agent, or Firm—Mark D. Kuller

(57) ABSTRACT

An acid-dyeable polymer composition comprising (a) polymer and (b) polymeric additive comprising repeating units having the formula:

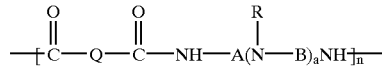

or salts thereof, wherein A, B and Q, which may be the same or different, are selected from aliphatic or aromatic substituents provided that at least four carbon atoms separate any two nitrogen groups, R is an aliphatic or aromatic group, a is 1 to 5, and n is 3 to about 1,000. In addition, an acid-dyed composition prepared from the composition, a process of acid dyeing the composition and a process for preparing the composition.

37 Claims, No Drawings

ACID-DYEABLE POLYMER COMPOSITIONS

FIELD OF THE INVENTION

This invention relates to acid-dyeable polymer compositions suitable for use in manufacturing fibers, fabrics, films and other useful articles, and to the articles and methods of making such compositions and articles. This invention also relates to processes for preparing the polymeric additive composition and using it to produce acid-dyeable polymer compositions.

BACKGROUND OF THE INVENTION

Polyesters, especially polyalkylene terephthalates, have excellent physical and chemical properties and have been widely used for resins, films and fibers. In particular, polyester fibers have a high melting point, and can attain high orientation and crystallinity. Accordingly, polyesters have excellent fiber properties such as chemical, heat and light stability, and high strength. However, polyesters, especially polyester fibers and fabrics, are difficult to dye. The molecular structure and the high levels of orientation and crystallinity that impart the desirable properties to the polyester also contribute to a resistance to coloration by dye compounds. Also contributing to the difficulty in dyeing polyester compositions is the characteristic that polyesters do not have dye sites within the polymer chain that are reactive to basic or acid dye compounds.

Nylon polymers are generally dyed more easily than polyesters because of their greater permeability and, in the case of the preferred acid dyes, because the amine end groups in nylon serve as dyesites. However, in many cases these amine-end dyesites are not present at sufficiently high concentration to give the desired depth of dyeing, particularly in fine-denier fibers. Therefore, improvements in the acid dyeability of nylon are desired.

To impart acid dyeability to polyester, it has been proposed to blend polyester with nylon 6 or nylon 6,6 to obtain the benefits of the amine-end dyesites in the resulting polyester/polyamide copolymer composition. The high concentrations of polyamide that may be required to impart dyeability in this polyester/polyamide composition can result in forming polyamide microfibrils, which decrease the physical properties of the polyester/polyamide copolymer and create difficulties in processing.

Co-polymerizing nitrogen containing compounds into polyester chains to improve acid dyeability has been disclosed in, for instance, U.S. Pat. Nos. 3,901,853, 4,001,189 and 4,001,190.

Canadian Patent No. 974,340 discloses acid-dyeable polyester compositions comprising tertiary nitrogen-containing polyamides. Preferred are copolyamides of two or more monomers inclusive of diamines, dicarboxylic acids and aminocarboxylic acids. The tertiary nitrogen component may be derived from piperazine derivatives; HOOC(—CH$_2$)$_n$—NR—(CH$_2$)$_n$—COOH, wherein R can be a group selected from the class consisting of aliphatic (branched or unbranched), cycloaliphatic, aryl or heterocyclic groups; R$_1$—NH—R$_2$—NR$_3$—R$_4$—NHR$_5$, wherein R$_2$ and R$_4$ can be a group selected from aliphatic (branched or unbranched), cycloaliphatic or aryl, R$_1$ and R$_5$ can be a group selected from hydrogen, aliphatic (branched or unbranched), cycloaliphatic or aryl, and R$_3$ is aliphatic (branched or unbranched), cycloaliphatic, aryl or heterocyclic; and cyclic polyamines. Piperazine ring containing polyamides are preferred and all of the examples are directed to these compounds, and to their use with polyethylene terephthalate or polybutylene terephthalate. Piperazine ring containing polyamides, a cyclic compound containing two nitrogens on a single ring, is not sufficiently thermally stable for many applications.

WO 01/34693 (corresponding to co-pending U.S. patent application Ser. No. 09/708,209 filed Nov. 8, 2000, now U.S. Pat. No. 6,576,340, filed Aug. 11, 2000 (Docket No. RD-7850)), discloses an acid-dyeable polyester composition made by melt-blending a polyester with a polymeric additive containing a secondary amine salt or a secondary amine, such as made by combining bis(hexamethylene)triamine with a second monomer unit such as a terephthalate. This technology is particularly useful for dyeing fabrics lightly, but adding 3–4 mole % or more of the dye has been found to impact physical properties, particularly tenacity. Tenacity is improved by adding phosphorous acid; however, phosphorous acid leads to instability of pack pressure and may cause spin problems over the long run. In addition, it was not possible to significantly increase the amount of BHMT added using phosphorus acid without spin problems. Therefore, an additive that can provide deep dyeable polyester with acid dyes without such drawbacks is desired.

All of the aforementioned documents are incorporated herein by reference.

It is desirable to have acid-dyeable nitrogen-containing polyester and/or nylon compositions with good physical properties which may be easily processed into fibers, films or other shaped articles and acid-dyed without expensive additives, special solutions, spinning problems, and/or complicated application procedures. It is particularly desirable to be able to deep dye such compositions or shaped articles.

SUMMARY OF THE INVENTION

The invention is directed to an acid-dyeable polymer composition comprising (a) polymer and (b) polymeric additive comprising repeating units having the formula:

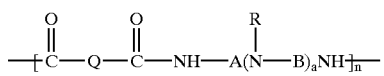

or salts thereof, wherein A, B and Q, which may be the same or different, are selected from aliphatic or aromatic substituents provided that at least four carbon atoms separate any two nitrogen groups, R is an aliphatic or aromatic group, a is 1 to 5, and n is 3 to about 1,000.

In one preferred embodiment, a is 1. In another preferred embodiment, a is greater than 1, preferably 2–5.

In one preferred embodiment, the polymer is polyester, preferably selected from the group consisting of polyalkylene terephthalate, polyalkylene isophthalate and polyalkylene naphthalate and copolyesters thereof and blends thereof, more preferably selected from the group consisting of polyethylene terephthalate, polytrimethylene terephthalate, polytetramethylene terephthalate and copolyesters thereof and blends thereof. One preferred polymer is polytrimethylene terephthalate.

In another preferred embodiment, the polymer is nylon. Nylon is acid-dyeable and the invention makes it possible to deep-dye nylon. For instance, with this invention it is possible to prepare nylon compositions, fibers and other products which can be dyed to a deep shade. Preferred nylons include nylon 6, nylon 4,6, nylon 6,6, nylon 6,10, nylon 6,12, nylon 12,12 and copolymers and blends thereof. Most preferred are nylon 6 and nylon 6,6.

Preferably, A, B and Q are selected from alkylene substituents containing from 4 to 20 carbons and arylene substituents containing from 6 to 18 carbons. More preferably, R is $C_1$–$C_8$ alkyl, and A and B are preferably $C_4$–$C_8$, alkylene and Q is preferably $C_2$–$C_{10}$ alkylene.

Preferably the polymeric additive is prepared by polymerizing (i) polyamine containing tertiary amine unit(s) or salts thereof and (ii) other monomer units, and the polyamine is selected from those having the formula: $H_2N(CH_2)_x[NR(CH_2)_y]_aNH_2$ or salts thereof, wherein x and y, which may be the same or different, are 4 to 10, a is 1 to 5, and R is an alkyl group containing 1 to 8 carbons in a straight or branched chain. In one preferred embodiment, a is 1. In another preferred embodiment, a is greater than 1, preferably 2–5.

Preferred polyamines include methyl-bis(hexamethylene) triamine, methyldibutylenetriamine, and dimethyltributylenetetramine or salts thereof.

Preferably the polymeric additive is prepared by polymerizing (i) polyamine containing tertiary amine unit(s) or salts thereof and (ii) aliphatic and aromatic dicarboxylic acids or esters. Preferred aliphatic and aromatic dicarboxylic acids or esters include dimethyl adipate, adipic acid, dimethyl terephthalate, terephthalic acid, dimethyl isophthalate, isophthalic acid, dimethyl naphthalate, naphthalic acid, or mixtures thereof. More preferred are dimethyl adipate, adipic acid, dimethyl terephthalate, terephthalic acid, or mixtures thereof. Most preferred are dimethyl adipate, dimethyl terephthalate, or mixtures thereof.

In one preferred embodiment, the tertiary amine of the polymeric additive is partly or completely salinized with phosphorous acid, phosphoric acid, pyrophosphoric acid or phenyl phosphinic acid. In another preferred embodiment, the polymeric additive is not a salt.

Preferably, n is from 3 to about 100, more preferably 3 to about 20.

Preferably, the composition is prepared by melt blending the polymer and the polymeric additive.

In preferred embodiments, the composition is an acid-dyeable polyester or nylon composition and the acid-dyeable polyester or nylon composition is prepared by melt blending the polyester and the polymeric additive. Preferably, the composition comprises (I) the nylon or the polyester and (II) a block or random copolymer prepared from (a) the polyester or the nylon and (b) the polymeric additive; and the amount of tertiary amine units is effective to promote or improve acid-dyeability.

Preferably, the composition contains at least about 6 moles tertiary amine units/per million grams of the polymer composition (mpmg). This amount will be sufficient to improve dyeability of nylons and other polymers.

When more than minor changes are desired, the composition preferably contains about 44 or more moles tertiary amine/per million grams of the resulting polymer (mpmg), even more preferably about 88 or more mpmg, and most preferably about 132 mpmg or more, and preferably the composition contains up to about 480 mpmg, more preferably up to about 322 mpmg and most preferably up to 240 mpmg.

The composition may be in the form of a shaped article, preferred embodiments including fiber, film or film layer. One preferred fiber is a monocomponent fiber. Other preferred fibers include multicomponent fibers, such as a component of a bicomponent fiber. In one preferred embodiment, the composition is in the form of at least one component of a bicomponent fiber comprising poly(ethylene terephthalate) and poly(trimethylene terephthalate) components.

The invention is also directed to an acid-dyed composition and a process of acid dyeing the composition or articles made therewith.

The invention is also directed to a process for preparing an acid-dyeable polymer composition.

The invention is further directed to a process for the preparation a polymer compound with repeating units having the formula:

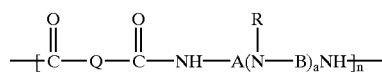

or salts thereof, wherein A, B and Q, which may be the same or different, are selected from aliphatic or aromatic substituents provided that at least four carbon atoms separate any two nitrogen groups, R is an aliphatic or aromatic group, a is 1 to 5, and n is 3 to about 1,000, the process comprising (1) polymerizing (a) polyamine containing secondary amine unit(s) or salts thereof and (b) aliphatic or aromatic dicarboxylic acids or esters, to form a polyamide, and (b) alkylating secondary amine units of the polyamide. Alkylation forms form the tertiary amine portion (NR—B). In one preferred embodiment, the alkylation comprises methylating under acidic conditions using formaldehyde and formic acid.

DETAILED DESCRIPTION OF THE INVENTION

By "acid-dyeable" it is meant that the composition itself, or fiber, fabric, film or any other article (e.g., shaped articles) made with the composition has an affinity for acid dyes.

The polymer composition preferably comprises either polyesters or nylons, or blends of one or more of these.

Reference to a polymer should be understood to mean a single polymer or blends or mixtures of such a polymer. In other words, "polyester" means one or more polyesters. Thus, for instance, if applicant refers to a composition containing x mole % of a polyester, the composition may comprise x mole % of one polyester or x mole % total of different polyesters. Similarly, "polymeric additive" means one or more polymeric additives.

One preferred class of polymers is polyesters. By "polyester" or "a polyester", applicant is referring to a single polyester, and/or to blends or mixtures of polyesters. The preferred polyesters are polyalkylene terephthalates, polyalkylene naphthalates and polyalkylene isophthalates, and polyalkylene terephthalates are most preferred. More preferred are polyethylene terephthalates, polytrimethylene terephthalates and polytetramethylene terephthalates, and polytrimethylene terephthalates are most preferred.

The Mn for the polyester (e.g., polyalkylene terephthalate) is preferably at least about 15,000, more preferably at least about 18,000, and is preferably about 40,000 or less, more preferably about 35,000 or less. The preferred Mn depends on the polyester used. The most preferred Mn for polytrimethylene terephthalate is 20,000–30,000.

In the absence of an indication to the contrary, a reference to polyester is intended to include reference to copolyesters. For instance, reference to "polyalkylene terephthalate" is meant also to encompass copolyesters, i.e., polyesters made using 3 or more reactants, each having two ester forming groups. For example, a copoly(ethylene terephthalate) can be used in which the comonomer used to make the copolyester is selected from the group consisting of linear, cyclic, and branched aliphatic dicarboxylic acids having 4 to 12 carbon atoms (for example butanedioic acid, pentanedioic acid, hexanedioic acid, dodecanedioic acid, and 1,4-cyclohexanedicarboxylic acid); aromatic dicarboxylic acids other than terephthalic acid and having 8–14 carbon atoms (for example isophthalic acid and 2,6-naphthalenedicarboxylic acid); and from linear, cyclic, and branched aliphatic diols having 3–8 carbon atoms (for example 1,3-propanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4–10 carbon atoms (for example, hydroquinone bis(2-hydroxyethyl) ether, or a poly(ethylene ether) glycol having a molecular weight below about 460, including diethylene ether glycol). The comonomer typically can be present in the copolyester at levels in the range of about 0.5 to about 15 mole %. Isophthalic acid, pentanedioic acid, hexanedioic acid, 1,3-propane diol, and 1,4-butanediol are preferred because they are readily commercially available and inexpensive.

Copoly(trimethylene terephthalate) made from 1,3-propanediol can also be used, in which case the comonomer(s) can be selected from the above list (except the aliphatic diols having 2–8 carbon atoms may be used and ethanediol should replace 1,3-propanediol in the list). The copolyester(s) can contain minor amounts of other comonomers, and such comonomers are usually selected so that they do not have a significant adverse affect on the amount of fiber crimp (in the case of a spontaneously crimpable polyester bicomponent fibers) or on other properties. Very small amounts of trifunctional comonomers, for example trimellitic acid, can be incorporated for viscosity control.

Another preferred class of polymers are nylons. By "nylon" is meant one or more high molecular weight polyamide(s) which contain an amide repeat linkage in the polymer backbone. They are generally tough, translucent and semicrystalline polymers, typically processed as a melt. There are two main classes of nylon polymers, depending on the regularity of the amide linkages. In one class the formula may be written as:

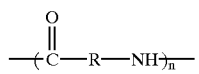

wherein R is preferably $C_5$–$C_8$ alkyl, most preferably $(CH_2)_5$, and wherein n is preferably about 100 to about 180. In the second class, the formula may be written as:

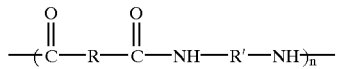

wherein R is preferably $C_4$–$C_{10}$ alkyl, most preferably $(CH_2)_4$, R' is preferably $C_4$–$C_{12}$ alkyl, most preferably $(CH_2)_6$, and wherein n is preferably about 40 to about 80. When the R group has 5 carbons, the first class shown above is generally referred to as nylon 6, and is prepared by ring opening of caprolactam. When the R group has 4 carbons and the R' group has 6 carbons, the second class shown above is generally referred to as nylon 6,6, and is made by polymerizing adipic acid and hexamethylene diamine. The invention is useful with all nylons, and preferred are nylon 6, nylon 4,6, nylon 6,6, nylon 6,10, nylon 6,12, nylon 12,12, or their copolymers and blends. Most preferred are nylon 6 and nylon 6,6, or blends thereof.

Nylon 6,6 preferably has an Mn of 10,000 or more, preferably has an Mn of 50,000 or less, preferably has Mw of 20,000 or more, and preferably has a Mw of 50,000 or less.

The polymers can be made using any technique, provided that the composition does not contain substantial amounts of anything that interferes with the goals of the invention. For instance, polytrimethylene terephthalates can be manufactured by the processes described in U.S. Pat. Nos. 5,015,789, 5,276,201, 5,284,979, 5,334,778, 5,364,984, 5,364,987, 5,391,263, 5,434,239, 5,510454, 5,504,122, 5,532,333, 5,532,404, 5,540,868, 5,633,018, 5,633,362, 5,677,415, 5,686,276, 5,710,315, 5,714,262, 5,730,913, 5,763,104, 5,774,074, 5,786,443, 5,811,496, 5,821,092, 5,830,982, 5,840,957, 5,856,423, 5,962,745, 5,990265, 6,140,543 and 6,245,844, EP 998 440, WO 00/14041, 99/54040 and 98/57913, H. L. Traub, "Synthese und textilchemische Eigenschaften des Poly-Trimethyleneterephthalats", Dissertation Universitat Stuttgart (1994), Schauhoff, S. (September 1996), "New Developments in the Production of Polytrimethylene Terephthalate (PTT)", Man-Made Fiber Year Book, and U.S. patent application Ser. Nos. 09/346,148, 09/382,970, 09/382,998, 09/500,340, 09/501,700, 09/502,322, 09/502,642, 09/503,599, and 09/505,785, all of which are incorporated herein by reference. Poly(trimethylene terephthalate)s useful as the polyester of this invention are commercially available from E. I. du Pont de Nemours and Company, Wilmington, Del. ("DuPont") under the trademark Sorona.

The polymeric additive comprises repeating units having the formula:

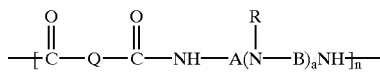

or salts thereof, wherein A, B and Q, which may be the same or different, are selected from aliphatic or aromatic substituents. At least four carbon atoms separate any two of the shown nitrogen groups. R is an aliphatic or aromatic group. R is inclusive of hetero atoms such as nitrogen or oxygen, may be substituted or unsubstituted, and is preferably an alkyl group of 1–8 carbon atoms, and more preferably an alkyl group of 1–4 carbon atoms. a is 1 to 5, and n is 3 to about 1,000. Preferably n is up to 100, and more preferably up to 20.

It should be understood that the polymeric additive can be polymer consisting essentially of or consisting of the repeating units shown above. Alternatively, it can be a polymer containing polymeric additive units and other polymeric units. Both types of polymeric additives are present in many instances, since when heated most of the polymeric additive will react with polymer or polymer forming compounds to form a new polymeric additive (polymer), while some of the initial polymeric additive remains unreacted. For instance, the composition prior to heating may comprise polyester and polymeric additive, and after heating such a composition may form a combination of polyester, block polymer of reacted polyester and polymeric additive, and unreacted polymeric additive. As another example additive, caprolactam and polymeric additive can form nylon and polymeric additive comprising nylon repeating units and polymeric additive repeating units.

It is preferred that four or more carbon atoms separate any two of the shown nitrogen groups, and most preferred that A and/or B comprise alkylene units having at least four carbons separating the nitrogen atoms, to obtain good thermal stability. The alkylene and arylene units of A and B may be substituted or unsubstituted, straight or branched, etc., as long as the substituent(s) and branches do not substantially interfere with dyeing or other fiber properties (e.g., the chain may contain an ether group).

The number of tertiary amines may vary from unit-to-unit and, therefore, a is an average. In one preferred embodiment, a is 1. In another preferred embodiment, a is greater than 1, preferably 2–5.

A, B and Q are preferably selected from alkylene substituents containing from 4 to 20 carbons and arylene substituents containing from 6 to 18 carbons.

Q is preferably alkylylene or arylene, such as phenylene or naphthylene. Q is preferably $C_4$–$C_{10}$, more preferably $C_4$–$C_8$, alkylene, and is preferably straight chain alkylene.

A and B are preferably $C_4$–$C_{10}$, more preferably $C_4$–$C_8$, alkylene, which are preferably straight chain alkylene.

Preferred for polyester and nylon is R is methyl. Another preferred R for nylon and polyester is isobutyl.

Any suitable synthesis may be used to prepare the polymeric additive. The polymeric additive can be prepared by polymerizing (a) polyamine containing tertiary amine unit(s) or salts thereof and (b) other monomer units (such as aliphatic and aromatic dicarboxylic acids or esters (e.g., dimethyl adipate, terephthalic acid, dimethyl terephthalate, etc.). Preferably, the polymeric additive can be prepared by polymerizing (a) polyamine containing secondary amine unit(s) or salts thereof and (b) other monomer units, followed by alkylating the secondary amine units in the resulting polyamide. The secondary amine units in the above resulting polyamide can be alkylated by methylation under acidic conditions using formaldehyde and formic acid.

In the case of a polyester, the composition may be prepared by a process comprising the steps of: (a) preparing a polymer by reacting triamine containing secondary amine or secondary amine salt unit(s) and aliphatic and aromatic dicarboxylic acid(s) or ester(s) selected from alkyl adipate, alkyl terephthalate, alkyl naphthalate or alkyl isophthalate, or mixtures thereof, or their corresponding acids, to form a secondary amine or secondary amine salt unit, (b) preparing a polymeric additive containing tertiary amine units by alkylating the secondary amine or secondary amine salt units of the polymer, and (c) mixing and heating said polymeric additive and the polyester at a temperature sufficient to form a acid-dyeable polymer composition comprising a block copolymer from some of the polyester and the unreacted polyester. The acid-dyeable polymer composition can then be dyed or formed into a shaped article and dyed. In a preferred embodiment the triamine is bis(hexamethylene) triamine and the dicarboxylic ester is dimethyl adipate.

In one embodiment of preparing the polymeric additive or compound, the triamine and second reactant are reacted at elevated temperature in the presence of water, followed by distilling off a methanol by-product, and then continuing the reaction under vacuum to form a polymer, and then alkylating the secondary amine units in the polymer chain to form the polymeric additive. In another embodiment, the process comprises or consists essentially of providing (a) the polyamine or polyamine salt and (b) dicarboxylic acid, and reacting them to form the polymeric compound. This is done without forming diester intermediate. In yet another embodiment, the process comprises providing a dicarboxylic acid, reacting the dicarboxylic acid with alcohol to form a diester (i.e., the diester analogue, such as dimethyl terephthalate}, and reacting the polyamine or polyamine salt with the diester to form the polymeric compound. Water may be used, and in one embodiment the reacting the diester with the polyamine to form the polymeric compound is carried out substantially in the absence of water. (Water from the atmosphere, as an impurity or as a minor component of an additive might be present, but it is not intentionally added in this embodiment.)

Preferably, the polyamine is selected from those having the formula:

or salts thereof, wherein A and B, which may be the same or different, are selected from aliphatic or aromatic substituents provided that at least four carbon atoms separate any two nitrogen groups, R is an aliphatic or aromatic group, and a is 2 to 5.

More preferably, the polyamine is selected from those having the formula:

or salts thereof, wherein x and y, which may be the same or different, are 4 to 10, a is 1 to 5, and R is an alkyl group containing 1 to 10 carbons in a straight or branched chain. Preferably, a is 1 to 4. In one preferred embodiment, a is 1. Preferred polyamines include methyl-bis(hexamethylene) triamine (x=y=6, a=1, and R=methyl), methyldibutylenetriamine (x=y=4, a=1 and R=methyl), and dimethyltributylenetetraamine (x=y=4, a=2 and R=methyl) or salts thereof, preferably they are combined with an adipate unit. In the case where the polyamine and other polymer or monomer unit are reacted and then alkylated, preferred is bis(hexamethylene)triamine, which is preferably reacted with dimethyl adipate.

The polymeric additive is preferably prepared from aliphatic and aromatic dicarboxylic acids or esters selected from the group consisting of dimethyl adipate, adipic acid, terephthalic acid, dimethyl terephthalate, dimethyl isophthalate, isophthalic acid, dimethyl naphthalate, naphthalic acid, or mixtures thereof. Preferred are dimethyl adipate and dimethyl terephthalate.

Preferred polymeric additives are poly-alkylimino-bisalkylene-adipamides, -terephthalamides, -isophthalamides, or -1,6-naphthalamides, and salts thereof. Most preferred are poly(6,6'-alkylimino-bishexamethylene adipamide), poly(6,6'-alkylimino-bistetramethylene adipamide), and poly (N,N'-dialkylimino-tri (tetramethylene) adipamide, wherein the alkyl group has one to about four carbon atoms.

The molar ratio of (i) the polyamine containing a secondary or tertiary amine unit, and (ii) the one or more other monomer unit is approximately 1:1. It is preferable to add a slight excess on the order of 1 mole %-10 mole % of the polyamine (i) relative to (ii) to promote end capping of the polymeric additive composition with primary amine unit during synthesis. In this embodiment of the invention, the amine groups on the end of the polymeric additive molecule are available to form amide linkages with the polymer component of the composition. An excess of (ii), the one or more other monomer units, may also be used.

In one preferred embodiment, dimethyl adipate is combined with bis(hexamethylene) triamine to form a poly(6, 6'-imino-bishexamethylene adipamide) which is then alkylated to form a poly(6,6'-alkylimino-bishexamethylene adipamide having repeat units according to the following formula:

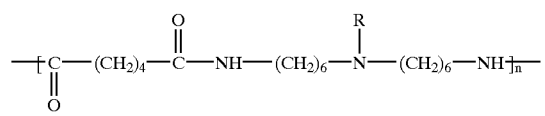

Therein, n is preferably at least 3 and preferably 30 or less, and R is an alkyl group containing from 1 to about 10 carbon atoms, preferably 1–6 carbon atoms and most preferably is methyl. (Prior to the alkylation step above, R was a hydrogen.) Any suitable polymeric synthesis route may be used to form the poly(6,6'-imino-bishexamethylene adipamide) polymer composition for use in the present invention. Any suitable alkylation method may be used to alkylate this polymer composition to the poly(6,6'-alkylimino-bishexamethylene adipamide) polymeric additive. Other preferred polyamides include 6,6'-alkylimino-bistetramethylene adipamide and N,N'-dialkyliminotributylene adipamide.

The polymeric additive can be made from dimethyl adipate and bis(hexamethylene triamine) according to the following preferred procedure: Dimethyl adipate and bis(hexamethylene triamine) are reacted at elevated temperature (up to about 230° C.), preferably in the presence of water and phosphorous acid. The methanol by-product is distilled off. Then, the reaction is continued under vacuum at about 0.2—about 1 mm Hg, preferably for about 30 minutes—about 1 hour, followed by cooling. This forms a secondary amine polymer composition. Alkylation is then carried out by reacting the secondary amine polymer composition with an alkylating agent. Preferably, the alkylation is carried out by dissolving the polymer composition in formic acid and water and reacting at an elevated temperature of about 80 to 120° C. with formaldehyde, and removing solvent under vacuum at a temperature of about 200 to 300° C. This forms a polymeric additive containing tertiary amine units. Alternatively, methyl-bis(hexamethylene triamine) can be made by a process such as described in the equation below and subsequently in Example 2:

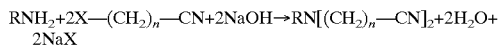

wherein R is an alkyl group having 1 to about 4 carbons, x is a halogen such as chlorine or bromine, and n is from 3 to 5. The resulting imino-bis-nitriles may then be reduced to the corresponding amines by hydrogenation over Raney cobalt catalyst, and the polymeric additive then made by polymerizing the dimethyl adipate and the resulting triamine.

The number average molecular weight (Mn) of the polymeric additive (before reaction with polymer units, such as polyester units or nylon units) is preferably at least about 1,000, more preferably at least about 3,000, and most preferably at least about 4,000, and preferably about 10,000 or less, more preferably about 7,000 or less, and most preferably about 5,000 or less. The preferred Mn depends on the polymeric additive used, the balance of the composition and the desired properties.

The polyamine, polymeric additive, composition or products made therewith can be salinized with any acid that stabilizes the amine or protects the amine group until dyeing is carried out. The acid is preferably added to the reaction mixture used to form the polymeric additive. Preferred are inorganic acids such as a phosphorus-containing acids, such as phosphorous acid, phosphoric acid, pyrophosphoric acid or phenyl phosphinic acid, most preferably phosphorous acid. However, when used with polyester compositions, preferably the amount of polymeric additive salinized with phosphorous acid is below 5 mole %, more preferably below 2 mole %, and is preferably above 1 mole % (wherein the mole % is calculated based on the total moles of tertiary amine groups in the polyamine compound).

When the polymeric additive is to be used with nylon, it is preferable to reduce the amount of phosphorous acid added to the reaction mixture for the polymeric additive. Since phosphorous acid is a catalyst for nylon polyamidation, a high level of phosphorous acid may cause a rise in pack pressure during spinning due to a molecular weight increase. With nylon, preferably the amount of polymeric additive salinized with phosphorous acid is below 1 mole % of the total (based on the total moles of tertiary amine groups in the polymeric additive). When used (with nylon), preferably the amount of polymeric additive salinized with phosphorous acid is at least 0.02 mole %, more preferably, at least 0.1 mole %, of the total (based on the total moles of tertiary amine groups in the polymeric additive).

Salinization is normally not necessary, and it is preferred not to salinize the polymeric additive or polymer composition.

The polymer composition of this invention is inclusive of unreacted polymer and polymeric additive.

Preferably the polymer composition is prepared by melt blending the polymeric additive and the polymer. The temperature should be above the melting points of each component but below the lowest decomposition temperature, and accordingly must be adjusted for any particular composition of polymer and polymeric additive. The polymer and polymeric additive may be heated and mixed simultaneously, pre-mixed in a separate apparatus before the heating occurs, or alternately may be heated and then mixed. Further, the polymer composition may be formed and then used, or may be formed during use (e.g., by mixing and heating chips or flakes of polymer and polymer additive in an extruder at a fiber or film manufacturing facility, or by blending molten polymer and polymeric additive in fiber or film manufacture.) Melt blending is preferably carried out at about 200 to about 295° C., most preferably about 260—about 285° C., depending on the polymer. For polytrimethylene terephthalate, the preferred temperatures are about 230 to about 270° C., most preferably about 260° C. For polyethylene terephthalate, the preferred temperatures are about 200 to about 295° C., most preferably about 280—about 290° C. For polybutylene terephthalate, the preferred temperatures are about 200 to about 295° C., most preferably about 250—about 275° C. For nylon 6,6, the preferred temperatures are about 200 to about 295° C., most preferably about 280—about 290° C. For nylon 6, the preferred temperatures are about 200 to about 295° C., most preferably about 260—about 275° C.

As noted previously, the polymer and the polymeric additive can react. Since there is more polymer than polymeric additive, the composition comprises polymeric additive comprising polymer and polymeric additive repeat units and unreacted polymer. In many instances it will also contain polymeric additive that has no units from the polymer.

When polyester and polymeric additive are reacted, the polymer and polymeric additive form a block copolymer by reacting at their ends. By block copolymer, for example with reference to the poly(6,6'-alkylimino-bishexamethylene adipamide) polymeric additive and polytrimethylene terephthalate, reference is to a polymer formed by the polyester joined to the polymeric additive by a covalent bond. In corresponding nylon compositions, a random copolymer can be formed when the mixing time is long because of transamidation reactions.

The polymeric additive can also be added to the reactants used to form the polymer and, then, when the polymer is formed some of the polymer will contain units derived from polymeric additive. This can result in block or random polymers being formed with polymeric additive as a unit in the chain.

The polymer composition contains an effective amount of polymeric additive containing a tertiary amine unit to promote acid-dyeability. The particular amount of polymeric additive used depends on the polyester or nylon compositions; the polymeric additive used, particularly the nature and amount of tertiary amines; the acid dye used. The preferred amount of polymeric additive can be calculated based on the amount of tertiary amine of the polymeric additive in the composition. Very small amounts of the polymeric additive are needed when it is desired to make minor corrections to the dye depth achieved by the polymer. In such instances the composition can contain as little as about 6 moles tertiary amine/per million grams of the resulting polymer (mpmg). When more than minor changes are desired, the composition preferably contains about 44 or more moles tertiary amine/per million grams of the resulting polymer (mpmg), even more preferably about 88 or more mpmg, and most preferably about 132 mpmg or more, and preferably the composition contains up to about 480 mpmg, more preferably up to about 322 mpmg and most preferably up to 240 mpmg. In the case of polytrimethylene terephthalate with the preferred polymeric additive prepared from Me-BHMT, the composition preferably contains at least about 48 mpmg, more preferably at least about 96 mpmg, and most preferably at least about 144 mpmg. For nylon 6,6 mixture with Me-BHMT polymeric additive, the tertiary amine content is preferably at least 44 mpmg and preferably no more than 88 mpmg.

The amount of polymeric additive needed to reach a particular addition level depends on the nature of the polymeric additive. For example, to reach 44 mpmg tertiary amine group with nylon 6,6 and Me-BHMT, it is necessary to add 1 mole (325.5 g) Me-BHMT polymer into 22,406 g nylon 6,6. When a is 2, for instance with dimethyltributylenetetramine, 0.5 mole of that polymer will give us 44 mpmg tertiary amine group in the resulting polymer.

It is believed that when linear polymer forming conditions are employed and the polyester (e.g., polyalkylene terephthalate) or nylon and the polymeric additive are mixed and heated to form a composition, the primary amine functional group at the end of the triamine molecule portion of the polymeric additive reacts to form an amide linkage with carboxyl groups of the polyester or nylon, leaving the tertiary amine unit portion of the triamine essentially unreacted and free to form a dye site. Thus the tertiary amine units become a part of the polymer chain and their presence in the polymer (e.g., polyester or nylon) fiber formed from the acid-dyeable compositions of the invention is permanent and not easily removed by washing, dry cleaning or other processes used to launder fabric articles.

The acid-dyeable polymer composition of the invention typically does not discolor and/or thermally degrade. This is especially advantageous when the polyester or nylon composition is thermally processed, for example by extrusion from the melt, into shapes such as films, fibers or membranes. The dyed articles are superior in color fastness, brightness, weather resistance, wear resistance and oxidation stability.

The polyester or nylon composition of the invention may be used to produce, acid-dyeable shaped articles, including high strength shaped articles. For example, in particular embodiments of the invention wherein the polyester is polytrimethylene terephthalate, melt-spun filaments having a tenacity of 2.0 g/d or more and a dye exhaustion of 30%–90% or higher, preferably 60%–95% or higher, are obtained. This is quite remarkable because polytrimethylene terephthalate is generally considered a difficult polyester to spin into high strength fibers or filaments. An added difficulty is that the use of additives to enhance one property of a polymer, e.g., acid-dyeability, often negatively affects other properties such as processability and strength. However, in accordance with the invention, acid-dyeable, high strength polyalkylene terephthalates, for example poly (trimethylene) terephthalate, fibers are obtained.

Other additives may be added to the acid-dyeable polyester compositions of this invention to improve strength or facilitate post extrusion processing. For example, hexamethylene diamine and/or polyamides such as nylon 6 or nylon 6,6 may be added in minor amounts (e.g., about 0.5–about 5 mole %) to add strength and processability.

The polymer composition can, if desired, contain various other additives, e.g., antioxidants, delusterants (e.g., $TiO_2$, zinc sulfide or zinc oxide), colorants (e.g., dyes or pigments), stabilizers, flame retardants, fillers (such as calcium carbonate), antimicrobial agents, antistatic agents, optical brightners, extenders, processing aids, viscosity boosters, toning pigments and other functional additives. $TiO_2$ may be added to the polymer or fibers.

The compositions of this invention are useful in fibers, fabrics, films and other useful articles, and methods of making such compositions and articles. By "fibers", reference is made to items recognized in the art as fibers, such as continuous filaments, staple, and other chopped fibers. The fibers may be monocomponent (sometimes also referred to as "homofibers"), or bicomponent or other multicomponent fibers, including sheath-core, eccentric sheath-core, and side-by-side fibers, and yarns made therefrom. Fabrics include knitted, woven and nonwoven fabrics. The compositions may form a film or a film layer, etc.

Bulked continuous filaments and fabrics may be manufactured according to the process described in U.S. Pat. Nos. 5,645,782 and 5,662,980, which are incorporated herein by reference. Other documents describing fibers and fabrics, and their manufacture, include U.S. Pat. Nos. 5,885,909 and 5,782,935, WO 99/06399, 99/27168, 99/39041, 00/22210, 00/26301, 00/29653, 00/29654, 00/39374 and 00/47507, EP 745 711, 1 016 741, 1 016 692, 1 006 220 and 1 033 422, British Patent Specification No. 1 254 826, JP 11-100721, 11-107036, 11-107038, 11-107081, 11-189920, and 11-189938, U.S. patent application Ser. Nos. 09/518,732 and 09/518,759, and H. L. Traub, "Synthese und textilchemische Eigenschaften des Poly-Trimethyleneterephthalats", Dissertation Universitat Stuttgart (1994), H. L. Traub "Dyeing properties of Poly(trimethylene terephthalate) fibres", Melliand (1995), H. L. Traub et al., "Mechanical Properties of fibers made of polytrimethylene terephthalate", Chemical Fibers International (CFI) Vol. 45,110–111 (1995), W. Oppermann et al. "Fibers Made of Poly(trimethylene terephthalate)", Dornbirn (1995), H. S. Brown, H. H. Chuah, "Texturing of Textile Filament Yarns Based on Poly (trimethylene terephthalate)", Chemical Fibers International, 47:1, 1997. pp. 72–74, Schauhoff, S. "New Developments in the Production of Polytrimethylene Terephthalate (PTT)", Man-Made Fiber Year Book (September 1996), all of which are incorporated herein by reference.

The acid-dyeable polyester compositions can be used to make acid-dyeable polyester bicomponent fibers, for example, bicomponent fibers comprising poly(ethylene terephthalate) and poly(trimethylene terephthalate) or poly (ethylene terephthalate) and poly(tetramethylene terephthalate). Bicomponent fibers based on poly(ethylene terephthalate) and poly(trimethylene terephthalate) are preferred. The polymeric additive can be incorporated into either or both components. The components can be arranged in a sheath-core, eccentric sheath-core, or side-by-side relationship. When it is desired that the bicomponent fiber be crimpable on drawing, heat-treating, and relaxing to form a stretchable fiber, an eccentric sheath-core or side-by-side relationship can be used; side-by-side is preferred for higher crimp levels. The preferred polyethylene terephthalate/polytrimethylene terephthalate bicomponent fibers can be manufactured as described in copending U.S. patent application Ser. No. 09/758,309 (Docket No. LP4440-CIP1), which is incorporated herein by reference. One or both of the polyesters used in these bicomponent fibers can be copolyesters. Comonomers useful in such copolyesters are described previously. The comonomer can be present in the copolyester at a level in the range of about 0.5 to 15 mole percent.

Acid dyeing is carried out using conventional techniques, such as those used for nylon. The polymer compositions, fibers, films, yarns, fabrics, membranes, etc., may be acid dyed.

The polymer composition, or fibers, films, yarns, fabrics, membranes and other useful shaped articles can be acid dyed to a dye exhaustion of about 30%–about 90% or higher, preferably about 60%–about 95% or higher.

The acid-dyeable polymer compositions according to the present invention contain tertiary amines and are basic compounds. As such, they have a relatively high affinity for acid dyes and can be dyed in a range of colors. For example, the acid dyeable polyester compositions may be spun into fibers and dyed with C.I. Acid Blue 25 (C.I. 62055), C.I. Acid Red 4 (C.I. 14710), C.I. Acid Yellow 40 (C.I. 18950), C.I. Acid Green 25 (C.I. 61570), Tectilon Yellow 2G, Tectilon Red 2B, Tectilon Blue 4R, Lanaset Yellow 2R, Lanaset Red 2B, Lanaset Blue 2R and Irgalan premetallized acid dyes either alone or in combination. (These dyes are available from Ciba Specialty Chemicals Corporation, High Point, N.C. (Ciba).) Acid dye conditions according to the invention are preferably from a pH of 3.5 or more, and a pH of 4.5 or more is especially preferred ranging up to a pH of about 6.5. Of course, lower pH values, e.g., 3.0, may be used if desired.

The invention is further directed to the acid-dyed polymer composition prepared by acid dyeing any of the acid-dyeable polymer compositions described above, and to a process comprising (1) providing the acid-dyeable polyester or nylon composition and (2) acid dyeing the composition, as well as acid-dyed fibers, film, yarn, fabric, membrane, etc.

TESTING METHODS

Intrinsic Viscosity

Intrinsic viscosity (IV) was determined using viscosity measured with a Viscotek Forced Flow Viscometer Y900 (Viscotek Corporation, Houston, Tex.) for the polyester dissolved in 50/50 weight % of trifluoroacetic acid/methylene chloride at a 0.4 grams/dL concentration at 19° C. following an automated method based on ASTM D 5225-92. These measured IV values were correlated to IV values measured manually in 60/40 weight % of phenol/1,1,2,2-tetrachloroethane, following ASTM D 4603-96.

Relative Viscosity

Relative Viscosity (RV) for polymer and fibers was determined using viscosity measured with a Viscotek Model Y900 forced flow viscometer by dissolving the polymer (fiber) in 90% formic acid at 25° C. The relative viscosity is presented as the ratio of the viscosity of a 8.4% (wt/wt) solution of the polymer in 90% formic acid to the viscosity of pure 90% formic acid.

DYEING TESTS

A: Tectilon Acid Dyes in the Presence of Carrier

The as-spun yarn was knitted into a sock sample. A 5 gram sock sample was put into a scouring solution containing 2 weight % Merpol HCS nonionic surfactant (DuPont) and 1 weight % acetic acid at 72° C. for 20 minutes. The sample was rinsed and placed into a 100 ml dye-bath containing 1 weight % of either Tectilon yellow 2G, Tectilon red 2B or Tectilon blue 4R and 0.5% Tanalon HIW carrier (Sybron Chemicals, Birmingham, N.J.) at pH 3. The dye bath was heated to 100° C. for 90 minutes. The sample was then rinsed with water and treated with 4% Erional PA solution (Ciba Corporation, Greensboro, N.C.) at pH 4.5–5.0 at 82° C. for 20 minutes for dye fixing. The remaining dye solution was measured in a visible spectrometer to calculate the exhaust.

Tectilon acid dyes were also run without a carrier in an identical manner to that above.

B: Lanaset Acid Dyes in the Absence of Carrier

The as-spun yarn was knitted into sock sample. A 5 gram sock sample was put into a scouring solution containing 2% Merpol HCS and 1% acetic acid at 72° C. for 20 minutes. The sample was rinsed and placed into a 100 ml dye bath containing 2% of either Lanaset Yellow 2R, Lanaset Red 2B, or Lanaset Blue 2R at pH 3. The dye bath was heated to 100° C. for 90 minutes. The sample was then rinsed with water and treated with 4% Erional PA solution at pH 4.5–5.0 at 82° C. for 20 minutes for dye fixing. The remaining dye solution was measured in a visible-range spectrometer to calculate the exhaust.

TENSILE TESTING OF FIBER YARNS

Tensile testing was carried out at 70° F. (21° C.), relative humidity 65%, on an Instron type tensile tester. Yarn samples were twisted 3 turns per inch and were tested at a crosshead speed of 3.6 inches/minute at a gauge length of 6 inches. Five samples were run for each item tested.

EXAMPLES

The following examples are presented for the purpose of illustrating the invention, and are not intended to be limiting. All parts, percentages, etc., are by weight unless otherwise indicated.

For convenience, the examples refer to the presence of "Me-BHMT" or "Me-BHMT polymer" with respect to polymeric additive having R is methyl since such compounds are compared to similar polymeric additives which are not methylated. In addition, the examples refer to Me-BHMT mole percentage for convenience, when reference is actually to the corresponding repeating units of the polymer additive and the polymer units.

Example 1

An acid-dyeable polytrimethylene terephthalate composition was prepared with poly(6,6'-iminobishexamethylene adipamide) as the polymeric additive.

In this example the polymeric additive poly 6,6'-methylimino-bishexamethylene adipamide was made in two steps by polymer methylation as follows: In step one, 215 g (1 mole) of bis(hexamethylene)triamine (BHMT), 174 g (1 mole) dimethyl adipate, 4.5 g phosphorous acid and 27 g (1.5 mole) water were first charged into a three-necked flask equipped with a mechanical stirrer and a thermocouple. The mixture was heated slowly up to 220° C. while methanol by-product was distilled. After the distillation was completed, the pressure in the flask was reduced slowly by a vacuum pump to 0.3–0.5 mm Hg at 220° C. and held for 10–20 minutes. The polymer melt was cooled and ground into flakes.

In step 2, the above polymer was dissolved in 300 g (6 moles) formic acid and 300 ml of water. The solution was filtered and charged with 150 g 37% formaldehyde (2 moles) solution. The solution was heated to 100° C. for 30 minutes. Then, the refluxing condenser was replaced by a distillation head and the solvent was stripped under vacuum until the solvent was completely removed at about 240° C. The polymer melt was cooled to room temperature and ground into flakes to make the methylated polymeric additive (poly (6,6'-methylimino-bishexamethylene adipamide)).

Polytrimethylene terephthalate (3GT) was prepared in a large-scale, batch two-vessel process. Molten dimethyl-terephthalate was added to 1,3 propanediol and tetraisopropyl titanate catalyst (Tyzor TPT, DuPont) in a transesterification vessel and the temperature was increased to 210° C. while methanol was removed. The resulting intermediate was transferred to a polycondensation vessel where the pressure was reduced to one millibar (10.2 Kg/cm$^2$) and the temperature was increased to 250° C. When the desired melt viscosity was reached, the pressure was increased and the polymer was extruded, cooled and cut into pellets. The pellets were solid-phase polymerized to an intrinsic viscosity of 1.3 dL/g in a tumble dryer operated at 212° C.

The previously prepared methylated polymeric additive was blended and reacted with the 3GT in a twin-screw extruder prior to spinning. Enough methylated polymer additive (300 g) was blended and reacted with 10 pounds (4540 g) of 3GT to form a copolymer containing 4.0 mole % tertiary amine group (based on the total moles of polymer repeating units including the repeating units of polymeric additive). After dry mixing and blending the polymers at room temperature for 3–5 minutes, the molten copolymer was spun at 255° C. through a 34 hole spinneret with 10 mil diameter holes at 500 meters/minute, followed by drawing 3X at 1500 meters/minute at 60° C.–90° C.

A control yarn of the 3GT used in this Example was also spun on the twin-screw spinning unit at 255° C. through a 34 spinneret with 10 mil diameter holes at 500 meters/minute, followed by drawing 3X at 1500 meters/minute at 60° C.–90° C.

The physical properties of the 3GT fiber containing 4.0 mole % tertiary amine group (from Me-BHMT) was satisfactory as shown in Table 1. The modified polymer was acid dyeable as shown by the results of dye exhaust testing in Table 2. The control 3GT yarn was not acid dyeable.

Example 2

In this example the polymeric additive is made from Me-BHMT, which was obtained by (step 1) coupling 6-aminocapronitrile to form 6,6"-iminobis(hexanenitrile) as disclosed in U.S. Pat. No. 4,906,783; (step 2) methylation under standard reaction conditions using formaldehyde and formic acid, and (step 3) hydrogenation over a Raney cobalt catalyst. Then (step 4), 108 g (0.471 mole) of Me-BHMT, 82 g (0.471 mole) dimethyl adipate, 0.97 g phosphorous acid and 12.9 g (0.71 mole) water were charged into a three-necked flask equipped with mechanical stirrer and a thermocouple. The mixture was heated slowly up to 190° C. while methanol by-product was distilled. After the distillation was completed, the flask pressure was reduced by a vacuum pump to 0.3–0.5 mm Hg at 190° C. (and held) for 15 minutes. The polymer melt was cooled and ground into flakes to make the methylated polymeric additive. Next 298 g of the methylated polymeric additive was blended with 7 pounds (2178 g) of 3GT and spun into 3GT yarn in a process similar to that described in Example 1. This produced a 3GT polymer modified with 4.0 mole % Me-BHMT polymer. The physical properties of the 3GT fiber and results of dye exhaustion testing are shown in Tables 1 and 2 below.

Example 3

3GT modified with 2.0 mole % Me-BHMT was prepared in a manner similar to Example 1 except that 259 g of methylated polymeric additive was melt blended and reacted with 17 pounds (7718 g) of 3GT prior to spinning. This copolymer fiber was less deeply dyed than the fiber of Example 1. Table 1 shows the tensile properties and Table 2 the dye results.

Example 4

3GT modified with 3.5 mole % me-BHMT was prepared in a manner similar to Example 2 except that 150 g of methylated polymeric additive was melt blended and reacted with 6 pounds (2724 g) of 3GT prior to spinning. Table 1 shows the tensile properties. Dye tests were not carried out with this sample.

The physical properties of the spun yarn from Examples 1, 2, 3 and 4 are described in Table 1 below. Dye exhaustion data is presented in Table 2. The physical properties and dye exhaustion of comparable spun yarn prepared using BHMT (without a methyl substituent at R) from U.S. patent application Ser. No. 09/708,209, filed Aug. 11, 2000 (Docket No. RD-7850) and WO 01/34693, both of which are incorporated by reference, Examples 1–3, is presented below in Tables 1A and 2A.

Table 1

Physical Properties of 3GT Yarn Containing Me-BHMT

| Sample ID | Mole % Tertiary Amine in Polymer*** | Yarn IV | Tenacity (GDP) | Modulus (GDP) | Elongation (%) | Denier |
|---|---|---|---|---|---|---|
| Control | — | 0.904 | 2.38 | 23.38 | 42.64 | 101.6 |
| Example3* | 2.0 | 0.827 | 2.27 | 23.67 | 44.88 | 101.9 |
| Example 4** | 3.5 | 0.805 | 2.07 | 24.10 | 46.76 | 97.9 |
| Example 1* | 4.0 | 0.729 | 2.06 | 24.39 | 58.16 | 96.0 |
| Example 2** | 4.0 | 0.786 | 2.07 | 22.25 | 54.55 | 98.1 |

*Me-BHMT polymer was made by polymer methylation.
**Me-BHMT polymer was made from Me-BHMT monomer and dimethyl adipate.
***Refers to mole % of tertiary amine units from Me-BHMT. Calculated by (Moles of Me-BHMT units in Me-BHMT polymeric additive × 100)/ (Moles of Me-BHMT units in Me-BHMT polymeric additive + Moles of polymer units (3GT)

TABLE 1A

Physical Properties of 3GT Yarn Containing BHMT

| Example | Mole % Secondary Amine in Polymer* | Yarn IV | Tenacity (g/d) | Modulus (g/d) | Elongation (percent) | Denier |
|---|---|---|---|---|---|---|
| Control | 0 | 0.82 | 2.6 | 23 | 64 | 103.5 |
| 1 | 1.5 | 0.80 | 2.3 | 23 | 62 | 103.6 |

TABLE 1A-continued

Physical Properties of 3GT Yarn Containing BHMT

| Example | Mole % Secondary Amine in Polymer* | Yarn IV | Tenacity (g/d) | Modulus (g/d) | Elongation (percent) | Denier |
|---|---|---|---|---|---|---|
| 2 | 3.0 | 0.70 | 1.8 | 23 | 66 | 103.4 |
| 3 | 4.5 | 0.64 | 1.7 | 19 | 62 | 116.9 |

*Refers to mole % of secondary amine units from BHMT. Calculated by (Moles of BHMT units in BHMT polymeric additive × 100)/(Moles of BHMT units in BHMT polymeric additive + Moles of polymer units (3GT))

Table 1 shows that the fiber properties of 3GT fibers prepared with 3GT compositions prepared with Me-BHMT polymer had only slightly decreased physical properties when compared with the control. It is important to keep the polymeric additive dry relatively dry, and control the spinning conditions to obtain good properties.

The decrease of physical properties is due to the IV loss. The physical properties of the 3GT fiber modified with Me-BHMT polymer are better than the 3GT fiber modified by BHMT polymer as shown in Table 1A.

TABLE 2

Acid Dye Exhaust on 3GT Fabric Containing Me-BHMT

| Sample | Mole % Tertiary Amine in Polymer*** | Lanaset Dye | | |
|---|---|---|---|---|
| | | Yellow 2R | Red 2B | Blue 2R |
| Control | — | 4.8 | 0.0 | 0.0 |
| Example 3* | 2.0 | 80.3 | 37.2 | 13.9 |
| Example 1* | 4.0 | 93.9 | 88.4 | 84.1 |
| Example 2** | 4.0 | 94.2 | 89.6 | 86.6 |

*Me-BHMT polymer was made bypolymer methylation.
**Me-BHMT polymer was made from Me-BHMT monomer and dimethyl adipate.
***Refers to mole % of tertiary amine units from Me-BHMT.

TABLE 2A

Dye Exhaust With BHMT

| Example | Mole % Secondary Amine in Polymer | Percent Lanaset Dye Exhaust | | |
|---|---|---|---|---|
| | | Yellow 2R | Red 2B | Blue 2R |
| 1 | 1.5 | 77.7 | 34.6 | 11.2 |
| 2 | 3.0 | 83.1 | 43.7 | 16.7 |
| 3 | 4.5 | 86.1 | 56.8 | 31.7 |

Table 2 shows that the addition of Me-BHMT polymer increases the acid-dyeability of 3GT significantly. At 4 mol % level, the acid dye uptake was in the range of 80–90% for yellow, red and blue, resulting in a deep shaded fabric. At the 2 mole % level, yellow is at a deep dye level since Lanaset yellow 2R has very high affinity to the fiber. Comparing Tables 2 and 2A, it can be see that Me-BHMT polymeric additive has significantly better dye exhaust than BHMT polymeric additive, particularly at higher addition levels (3mole % or more).

Example 5

Additional compositions suitable for improving the acid-dyeability of 3GT fiber were prepared in Examples 5a to 5d below.

Example 5a—MeDBT—1.5 mol %

Polytrimethylene terephthalate modified with 1.5 mole % 4,4'-Methylimino-bis-butylamine (Methyldibutylenetriamine, MeDBT) was prepared in a similar manner to Example 2 (step 4) except that 0.73 g of methylated polymeric additive was mixed (pepper and salt) with 26.27 g of PTT and press spun.

Example 5b—MeDBT—4.5 mol %

Polytrimethylene terephthalate modified with 4.5 mole % 4,4'-Methylimino-bis-butylamine (Methyldibutylenetriamine, MeDBT) was prepared in a similar manner to Example 2 (step 4) except that 2.19 g of methylated polymeric additive was mixed (pepper and salt) with 24.81 g of PTT and press spun.

Example 5c—Me2TBT—1.5 mol %

Polytrimethylene terephthalate modified with 1.5 mole % 5,10-Diaza-5,10-dimethyl-1,14-tetradecanediamine (Dimethyltributylenetetramine, Me2TBT) was prepared in a similar manner to Example 2 (step 4) except that 0.62 g of methylated polymeric additive was mixed (pepper and salt) with 26.38 g of PTT and press spun.

Example 5d—Me2TBT—4.5 mol %

Polytrimethylene terephthalate modified with 4.5 mole % 5,10-Diaza-5,10-dimethyl-1,14-tetradecanediamine (Dimethyltributylenetetramine, Me2TBT) was prepared in a similar manner to Example 2 (step 4) except that 1.86 g of methylated polymeric additive was mixed (pepper and salt) with 25.14 g of PTT and press spun.

Example 6

A bicomponent fiber was prepared as follows: 150 g Me-BHMT polymeric additive prepared as in Example 1 and 10 pounds (4.5kg) of 3GT were tumble mixed and compounded in a twin screw extruder at 230° C. The resulting pellets were dried at 120° C. for 16 hours, and poured into a hopper, and extruded through a bicomponent spinneret into fiber at 255–265° C. In the same time, polyethylene terephthalate pellets (Crystar® 4415 polyethylene terephthalate, DuPont) were added into another hopper, extruded at 275–285° C. into the same spinneret forming a bicomponent fiber with equal amounts of polyethylene terephthalate and polytrimethylene terephthalate, only the latter containing acid dye modifier. The polymers were melt spun through a 68 hole spinneret to form 34 side-by-side snowman cross-section bicomponent filaments (50/50 v/v) just below the spinneret face. (An example of such a cross-section is illustrated in FIG. 4 of U.S. Pat. No. 3,671,379.) The spinneret was maintained at 275° C. The filaments were spun past a quench zone 66 inches (1.7 m) long through ambient temperature cross-flow air moving at 0.14 ft./sec (4.27 cm/sec), past a finish tip to lubricate the yarn, and onto a 60° C. feed roll with a surface speed of 742 meters/minute. This yarn was then drawn 3.5× with a 90° C. draw roll with a surface speed of 3200 meters/minute, and then onto a 150° C. heat-treating roll operating at 2600 meters/minute, over a 2600 meters/minute quench roll operating at ambient, and onto a windup. The yarn had 34 filaments, and upon hot relaxation, it spontaneously displayed helical crimp. The physical properties of the resulting bicomponent yarn are shown in Table 3.

In this example, the tensile property was tested by twisting three turns per inch, running at 3 inch/minute (7.62 cm/min) crosshead speed and 5 inch (12.7 cm) gauge length.

The control was a bicomponent fiber made as above, except that it did not contain polymeric additive.

TABLE 3

Physical Properties of 3GT/2GT Bicomponent Yarns

| Sample | Mole Percent* | Tenacity, g/d | Modulus, g/d | Elongation % | Denier |
|---|---|---|---|---|---|
| Control | 0 | 3.74 | 26.50 | 20.14 | 75.6 |
| Example 6 | 2.0 | 3.42 | 45.54 | 18.39 | 77.9 |

*Mole % tertiary amine in polymer.

The tenacity of the bicomponent yarn was decreased slightly compared to the Control sample, but the physical properties shown are within an acceptable range for many applications requiring a dyeable bicomponent fiber. The yarn was knitted into socks and dyed with acid dyes into light gray and beige colors. The color appeared solid even though the polyethylene terephthalate part was not modified for acid dyeability.

Example 7

In this example, the polymeric additive was prepared for use with nylon by polymerizing BHMT with dimethyl adipate and then alkylating. The amount of phosphorous acid was reduced from the 5.5 mole % used in Example 1 (for a polyester) to 0.25 mole %.

To a 10 lb. (4.5 kg) scale autoclave, 2,430 g dimethyl adipate (13.95 moles), 3004 g BHMT (13.95 moles), 2.86 g phosphorous acid (0.0349 mole), and 377 g water (20.93 moles) were charged. The mixture was heated up while stirring at 30 rpm. At about 130° C., methanol started to come out as the distillate. The temperature was raised to 200° C. to finish the distillation. The pressure was reduced slowly by a vacuum pump to 1 mm Hg and held for 10–20 min. The polymer melt was cooled and ground into flakes.

Then 326 g polymer flakes were dissolved in 300 g formic acid and 300 ml water. The solution was charged with 150 g 37% formaldehyde (2 moles) solution. the solution was heated 100° C. for 30 min. Then, the refluxing condenser was replaced by a distillation head and the solvent was stripped under vacuum until the solvent was completely removed at about 220° C. The polymer melt was cooled to room temperature and ground into flakes to make the methylated polymeric additive.

Example 8

This example shows the spinning of nylon 6,6 polymer with Me-BHMT polymer made by the process of Example 7. First 6810 g nylon 6,6 flakes were mixed with 102 g Me-BHMT polymer. Then the polymer was spun at 285° C. through a 34 hole spinneret with 10 mil diameter holes at 1000 meters/minute, followed by drawing 2.6× at 2600 meters/min. at 60–90° C. (Example 8a). Also 6810 g nylon 6,6 flakes were mixed with 102 g Me-BHMT polymer and compounded by extruding in a twin screw extruder at 270° C. (Example 8b). The polymer mixture was spun and drawn as were the tumble mixed samples. Physical properties of the resulting fibers are shown in Table 4.

TABLE 4

Physical Properties of Deep Dye Nylon Fiber

| Item | Denier | Modulus | Tenacity | Elongation |
|---|---|---|---|---|
| Control | 109.6 | 20.14 | 3.41 | 77.54 |
| Tumble mix | 104.8 | 20.28 | 3.53 | 84.57 |
| Tumble mix | 101.6 | 22.92 | 3.55 | 76.47 |
| Compounded | 119.1 | 22.53 | 3.74 | 56.98 |
| Compounded | 108.8 | 21.77 | 3.65 | 62.92 |

This data shows that the test samples have similar physical properties to the control sample. The addition of Me-BHMT polymeric additive at low levels such as 1 mole % did not greatly affect fiber strength.

TABLE 5

Dye take-up of nylon 6, 6 sock samples

| Sample | Mole % Tertiary Amine in Polymer* | RV | Amine Groups (eq/10$^6$ g) | Tectilon dye take-up (wt % of fiber) | | |
|---|---|---|---|---|---|---|
| | | | | Yellow 2G | Red 2B | Blue 4R |
| Example 8b (nylon control) | — | 53.7 | 30.5 | 0.944 | 0.966 | 0.986 |
| Example Ba | 1.0 | 71.52 | 67.9 | 2.769 | 2.601 | 2.229 |

*Refers to mole % of tertiary amine units from Me-BHMT.

The addition of 1 mole % Me-BHMT increased the amine groups in the nylon 6,6 by 37.9 mpmg. The total 67.9 mpmg includes both amine ends and the tertiary amine groups. The increase in amine groups resulted in a significant increase in dye take-up. As a result, the fabric color is much deeper.

Example 9

Starting Materials

6-Aminocapronitrile, 4-bromobutyronitrile, and 5-chlorovaleronitrile are commercially available. 6-Bromocapronitrile was prepared as follows:

A mixture of 1,5-dibromopentane (1028 g, 4.5 mol), sodium cyanide (219 g, 4.5 mol), Adogen® 464 phase-transfer catalyst (21 g), and 535 mL of water was left stirring rapidly at room temperature under nitrogen for three days. Analysis of the organic phase of the resulting product mixture using gas chromatography and proton NMR spectroscopy showed it to consist of approximately 34 mol % of 1,5-dibromopentane, 42 mol % of 6-bromocapronitrile, and 24 mol % of pimelonitrile. From this mixture, 6-bromocapronitrile was isolated by fractional distillation under vacuum; b.p. 50° C. at 0.3 Pa.

Example 9a 6,6'-Methylimino-bis-capronitrile

To a stirred mixture of 259 mL of 40% aqueous methylamine (11.6 M, 3.0 mole) and 600 mL of 6.0 M aqueous sodium hydroxide (3.6 mole), 528 g (3.0 mole) of 6-bromocapronitrile was added slowly under nitrogen. The temperature of the reaction mixture was kept below 30° C. during addition by cooling with an ice-water bath. Upon completion of addition, the mixture was left stirring at room temperature overnight.

The product mixture was transferred to a separatory funnel, and the aqueous layer was drawn off. The organic layer was washed with a 200-mL portion of water, then distilled under vacuum to afford 247 g of 6,6'-methylimino-bis-capronitrile (1.12 mole, 74% of theory), bp 145° C. at 0.8 Pa pressure.

Example 9b 6,6'-Methylimino-bis-hexylamine

A 135.3-g portion of 6,6'-methylimino-bis-capronitrile was dissolved in 500 mL of ethanol, and hydrogenated over 15.0 g of Raney Cobalt 2724 at 100° C. and a pressure of 4140 kPa for four hours. Catalyst was removed from the product solution by filtration, and ethanol from the filtrate by rotary evaporation at reduced pressure. The residue was subjected to distillation to obtain 108.6 g of 6,6'-methylimino-bis-hexylamine (0.47 mole, 77% of theory), bp 115° C. at 2.1 Pa.

Example 10

Example 10a 6,6'-Imino-bis-capronitrile

The palladium-catalyzed coupling of 6-aminocapronitrile (N-112) to form 6,6'-imino-bis-capronitrile was conducted in a series of four runs, as shown in the following table:

TABLE 6

| Run No. | Wt N-112, g | Wt catalyst, g | Temp, ° C. | Time, hr |
| --- | --- | --- | --- | --- |
| 1 | 500 | 5.0 | 220 | 4 |
| 2 | 181 | 2.0 | 200 | 10 |
| 3 | 452 | 10.0 | 200 | 4 |
| 4 | 272 | 10.0 | 200 | 4 |

In each case the catalyst was 5.0 wt % palladium on activated carbon (wet; weights given include about 50% water). Throughout each run, the reaction mixture was sparged with nitrogen to remove ammonia formed by the coupling reaction.

Upon distillation under vacuum, the combined products of the four runs afforded 325 g of 6,6'-imino-bis-capronitrile, bp 195 ° C. at 267 Pa.

Example 10b 6,6'-Propylimino-bis-capronitrile

A mixture of 6,6'-imino-bis-capronitrile (20.7 g, 100 mmol), 1-iodopropane (18.7 g 110 mmol), potassium carbonate (16.6 g, 120 mmol), and 100 mL of tetrahydrofuran was stirred and heated at 60° C. under nitrogen for three days. The product mixture was cooled to room temperature, and 25 mL of water was added to dissolve most of the solids. The aqueous layer was drawn off in a separatory funnel, a 125-mL portion of methyl t-butyl ether was added, and another small aqueous layer thus formed was drawn off. Gas chromatographic analysis of the product solution showed it to contain a small amount of unreacted secondary amine. Therefore, 10 g of anhydrous potassium carbonate and 2.5 g of 4-nitrobenzoyl chloride were added, and the mixture was stirred at room temperature for 30 minutes. Subsequent analysis by gas chromatography showed this treatment to have completely eliminated the unreacted starting material. The mixture was filtered, and solvent was removed by rotary evaporation at reduced pressure. Molecular distillation of the residue under high vacuum afforded 20.2 g (81 mmol, 81% of theory) of 6,6'-propylimino-bis-capronitrile.

Example 10c

Preparation of 6,6'-Propylimino-bis-hexylamine

A mixture of 20.2 g of 6,6'-propylimino-bis-capronitrile, 15 g of absolute ethanol, 15 g of anhydrous ammonia, and 2.0 g of Raney Cobalt 2724 was stirred and heated for two hours at 75° C. under hydrogen at a pressure of 3450 kPa. The product mixture was filtered, and ethanol and ammonia were removed from the filtrate by rotary evaporation at reduced pressure. Molecular distillation of the residue under high vacuum afforded 15.5 g (60.2 mmol, 74% of theory) of 6,6'-propylimino-bis-hexylamine.

Example 11a

N,N'-Dimethyl-N,N'-bis(3-cyanopropyl)-1,4-butanediamine

To a mixture of 14.9 g (0.13 mol) of N,N'-dimethyl-1,4-butanediamine (F. Devinsky, I. Lacko, and L. Krasnec, Synthesis (1980), 303–305) and 50 mL of 6M aqueous sodium hydroxide was added with stirring and cooling 39.9 g (0.27 mol) of 4-bromobutyronitrile. The mixture was left standing overnight, then was extracted several times with methylene chloride. Removal of solvent from the combined extracts by rotary evaporation at reduced pressure, followed by molecular distillation at high vacuum, afforded 26.5 g of N,N'-dimethyl-N,N'-bis(3-cyanopropyl)-1,4-butanediamine (0.11 mol, 83% of theory).

Example 11b

Dimethyltributylenetetramine

A 26.5-g portion of N,N'-dimethyl-N,N'-bis(3-cyanopropyl)-1,4-butanediamine dissolved in 20 mL of ethanol was hydrogenated over 1.3 g of Raney Cobalt 2724 for eight hours at 75° C. and 900 psig hydrogen pressure. Following removal of catalyst and solvent the product was distilled at ca. 130° C. in a molecular still under high vacuum, affording 24.0 g of dimethyltributylenetetramine.

Example 12

A polymeric additive was prepared in a manner similar to that described in Example 2 with the exception that no water was added. In this procedure 161.4 g (703.5 mmol) of Me-BHMT, 121.9 g (700.0 mmol) of dimethyladipate and 1.99 g (14 mmol, 2 mol %) of phenylphosphinic acid were charged to a 1 L three-necked round bottom flask fitted with mechanical stirring, a thermocouple, a syringe needle for introduction of a nitrogen purge, and a short-path still head. Under a light nitrogen purge, the mixture was heated quickly to 200° C., at which point methanol by-product began to distill. The methanol distillation required 33 minutes, during which time the reaction temperature was maintained between 200–207° C. At this point, the nitrogen purge was stopped and the flask pressure was reduced (<1 mm Hg) using a vacuum pump and the reaction temperature raised to 210–214° C. After 27 minutes under vacuum the heat was turned off and the reaction mixture was allowed to cool under vacuum. When cool, the solid product was recovered and ground to yield 218 g (92%) of colorless polymeric additive. This polymeric additive had a relative viscosity of about 7.6 and analysis (by depolymerization and gas chromatography) showed it to contain about 32 moles per million grams (mpmg) of BHMT. A sample of polymeric acid prepared in a manner identical with Example 2 had relative viscosity of about 7.0 and a BHMT content of 34 mpmg. This shows that very little Me-BHMT (less than 1 mole %) converted to BHMT.

Example 13

A polymeric additive was prepared by reacting Me-BHMT directly with adipic acid as a concentrated aqueous salt solution. The 101.9 g of salt solution (73.7 wt %) was prepared by first dissolving 45.88 g (200 mmol) of Me-BHMT in 26.80 g of distilled water in a 250 mL Erlenmeyer flask provided with a nitrogen blanket. Next, with magnetic stirring, 29.32 g (200 mmol) of adipic acid was added in portions in a way that mixing was not impeded. The salt preparation was complete and ready for use when the adipic acid has dissolved. A portion, 50.94 g, of this salt solution was charged to a 250 mL three-necked round bottom flask fitted as described in Example 12 and to this was added 0.284 g (2.0 mmol, 2 mol %) of phenyl phosphinic acid. With stirring and a light nitrogen purge, this mixture was heated to 200° C. over a period of 11 minutes. Added and byproduct water were distilled during the heat-up and subsequently the reaction mixture was held for 40 minutes at 200° C. At this point the nitrogen purge was stopped and the flask pressure reduced as described in Example 12. Heating was stopped after 20 minutes under reduced pressure at 200° C. The reaction product was cooled under vacuum, recovered and ground to yield 28.6 g (84%) of colorless polymeric acid. This polymeric additive had a relative viscosity of 8.2 and a BHMT content of 56 mpmg. This shows that very little Me-BHMT (less than 2 mole %) converted (demethylated) to BHMT.

Example 14 (Comparative)

A comparative polymeric additive was prepared according to the procedure described in Example 12 by replacing the Me-BHMT with Me-BTMT (bis(3-aminopropyl) methylamine). In this preparation, 146.0 g (1.005 mol) of Me-BTMT, 174.2 g (1.000 mol) of dimethyladipate, 28 g of distilled water (1.556 mol) and 7.77 g (0.020 mol, 2 mol %) of a 50% aqueous solution of tolylphosphinic acid potassium salt were combine and reacted to form the polymeric additive. This polymeric additive was melt blended at 1 and 1.5 wt % (0.9 and 1.3 mol %) with nylon 66 polymer and subsequently spun into fiber (in a similar manner as described in Example 8) along with the base nylon 66 resin used in the blending. Similarly, blends of Me-BHMT polymeric additive, at 1 and 1.5 mol %, with nylon 66 polymer were prepared and subsequently spun along with the base resin used in the blending. Changes in polymer molecular weight caused by the spinning conditions, as reflected in relative viscosity, are summarized in Table 7.

TABLE 7

Comparison of Polymer Relative Viscosity Before and After Spinning

| Polymeric Additive | Amount (mol %) | Polymer RV | Fiber RV |
|---|---|---|---|
| Me-BTMT | 0.9 mol % | 61.1 | 42.1 |
|  | 1.3 mol % | 59.3 | 40.1 |
|  | none | 66.7 | 50.6* |
| Me-BHMT | 1.0 mol % | 60.9 | 62.7 |
|  | 1.5 mol % | 51.6 | 48.9 |
|  | none | 53.0 | 53.5 |

*Ends analysis of the polymer and fiber reveal that the relative viscosity loss for this sample was due to hydrolysis and not polymer degradation.

The data in Table 7 shows that Me-BHMT sample had good viscosity stability from polymer to fiber whereas the Me-BTMT sample did not. Ends analysis showed that the RV loss for the Me-BTMT samples was due to polymer degradation rather than hydrolysis, whereas the control sample in that set had a decrease in relative viscosity due to hydrolysis.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An acid-dyeable polymer composition comprising (a) polymer and (b) polymeric additive comprising repeating units having the formula:

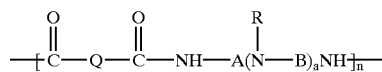

or salts thereof, wherein A, B and Q, which may be the same or different, are selected from aliphatic or aromatic substituents provided that at least four carbon atoms separate any two nitrogen groups, R is an aliphatic or aromatic group, a is 1 to 5, and n is 3 to about 1,000.

2. The composition of claim 1 wherein a is 1.
3. The composition of claim 1 wherein a is greater than 1.
4. The composition of claim 1 wherein a is 2–5.
5. The composition of claim 1 wherein the polymer is polyester.
6. The composition of claim 1 wherein the polymer is selected from the group consisting of polyethylene terephthalate, polytrimethylene terephthalate and polytetramethylene terephthalate, and copolyesters and blends thereof.
7. The acid-dyeable polyester composition of claim 5 wherein the polymer is polytrimethylene terephthalate.
8. The composition of claim 1 wherein the polymer is nylon.
9. The composition of claim 1 wherein A, B and Q are selected from alkylene substituents containing from 4 to 20 carbons and arylene substituents containing from 6 to 18 carbons.
10. The composition of claim 1, wherein the polymer is selected from polyester and nylon, R is $C_1$–$C_8$ alkyl, A and B are $C_4$–$C_8$ alkylene and Q is $C_4$–$C_{10}$ alkylene.
11. The composition of claim 1 wherein the polymeric additive is prepared by polymerizing (i) polyamine containing tertiary amine unit(s) or salts thereof and (ii) other monomer units, and the polyamine is selected from those having the formula:

$$H_2N(CH_2)_x[NR(CH_2)_y]_aNH_2$$

or salts thereof, wherein x and y, which may be the same or different, are 4 to 10, a is 1 to 5, and R is an alkyl group containing 1 to 8 carbons in a straight or branched chain.

12. The composition of claim 11 wherein a is 1.
13. The composition of claim 11 wherein a is 2 to 5.
14. The composition of claim 11 wherein the polyamine is selected from the group consisting of methyl-bis (hexamethylene) triamine, methyldibutylenetriamine, and dimethyltributylenetetramine or salts thereof.
15. The composition of claim 1 wherein the polymeric additive is prepared by polymerizing (i) polyamine containing tertiary amine unit(s) or salts thereof and (ii) dimethyl adipate, adipic acid, dimethyl terephthalate, terephthalic acid, dimethyl isophthalate, isophthalic acid, dimethyl naphthalate, naphthalic acid or mixtures thereof.
16. The composition of claim 1 wherein the polymeric additive is prepared by a process comprising (1) polymerizing (a) polyamine containing secondary amine unit(s) or salts thereof and (b) aliphatic or aromatic dicarboxylic acids or esters, to form a polyamide, and (b) alkylating secondary amine units of the polyamide.

17. The composition of claim 1 wherein the polymeric additive is prepared by polymerizing (i) polyamine containing tertiary amine unit(s) or salts thereof and (ii) dimethyl adipate, dimethyl terephthalate, or mixtures thereof.

18. The composition of claim 1 wherein the tertiary amine of the polymeric additive is partly or completely salinized with phosphorous acid, phosphoric acid, pyrophosphoric acid or phenyl phosphinic acid.

19. The composition of claim 1 wherein the polymeric additive is not a salt.

20. The composition of claim 1 wherein n is from 3 to about 100.

21. The composition of claim 1 wherein n is from 3 to about 20.

22. The composition of claim 1 wherein the composition is prepared by melt blending the polymer and the polymeric additive.

23. The composition of claim 1 comprising at least about 6 moles tertiary amine units/per million grams of the polymer composition.

24. The composition of claim 1 comprising about 44 to about 480 moles tertiary amine units/per million grams of the polymer composition.

25. The composition of claim 1 comprising about 88 to about 322 moles tertiary amine units/per million grams of the polymer composition.

26. The composition of claim 1 comprising about 132 to about 240 moles tertiary amine units/per million grams of the polymer composition.

27. The composition of claim 1 in the form of a fiber.

28. The composition of claim 23 wherein the fiber is a monocomponent fiber.

29. The composition of claim 23 in the form of at least one component of a bicomponent fiber comprising poly(ethylene terephthalate) and poly(trimethylene terephthalate) components.

30. The composition of claim 1 in the form of a film or film layer.

31. The composition of claim 6 wherein a is 1, R is $C_1$–$C_8$ alkyl, A and B are $C_4$–$C_8$ alkylene, n is 3–20, the polymeric additive is prepared by polymerizing (i) polyamine containing tertiary amine unit(s) or salts thereof and (ii) dimethyl adipate, adipic acid, dimethyl terephthalate, terephthalic acid, or mixtures thereof, the polymeric additive is not a salt or the tertiary amine of the polymeric additive is partly or completely salinized with phosphorous acid, phosphoric acid, pyrophosphoric acid or phenyl phosphinic acid, and the composition contains about 44 to about 480 moles tertiary amine units/per million grams of the polymer composition.

32. The composition of claim 6 wherein a is 2–5, R is $C_1$–$C_8$ alkyl, A and B are $C_4$–$C_8$ alkylene, n is 3–20, the polymeric additive is prepared by polymerizing (i) polyamine containing tertiary amine unit(s) or salts thereof and (ii) dimethyl adipate, adipic acid, dimethyl terephthalate, terephthalic acid, or mixtures thereof, the polymeric additive is not a salt or the tertiary amine of the polymeric additive is partly or completely salinized with phosphorous acid, phosphoric acid, pyrophosphoric acid or phenyl phosphinic acid, and the composition contains about 44 to about 480 moles tertiary amine units/per million grams of the polymer composition.

33. A composition prepared by acid dyeing the composition of claim 1.

34. A process comprising acid dyeing the composition of claim 1.

35. A process for the preparation a polymer compound with repeating units having the formula:

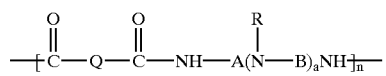

or salts thereof, wherein A, B and Q, which may be the same or different, are selected from aliphatic or aromatic substituents provided that at least four carbon atoms separate any two nitrogen groups, R is an aliphatic or aromatic group, a is 1 to 5, and n is 3 to about 1,000, the process comprising (1) polymerizing (a) polyamine containing secondary amine unit(s) or salts thereof and (b) aliphatic or aromatic dicarboxylic acids or esters, to form a polyamide, and (b) alkylating secondary amine units of the polyamide.

36. A process as claimed in claim 35 wherein the alkylation comprises methylating under acidic conditions using formaldehyde and formic acid.

37. A process as claimed in claim 35 wherein a is 1.

* * * * *